United States Patent
Robertsson et al.

(10) Patent No.: US 8,379,481 B2
(45) Date of Patent: Feb. 19, 2013

(54) 3D DEGHOSTING OF MULTICOMPONENT OR OVER/UNDER STREAMER RECORDINGS USING CROSS-LINE WAVENUMBER SPECTRA OF HYDROPHONE DATA

(75) Inventors: Johan O. A. Robertsson, Grantchester (GB); Massimiliano Vassallo, Brighton (GB); Dirk-Jan Van Manen, Redhill (GB); Ali Özbek, Milton (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 13/396,299

(22) Filed: Feb. 14, 2012

(65) Prior Publication Data

US 2012/0140592 A1 Jun. 7, 2012

Related U.S. Application Data

(62) Division of application No. 12/169,260, filed on Jul. 8, 2008, now Pat. No. 8,116,166.

(60) Provisional application No. 60/971,189, filed on Sep. 10, 2007.

(51) Int. Cl.
*G01V 1/38* (2006.01)
(52) U.S. Cl. .............................. 367/24; 367/21
(58) Field of Classification Search .................. 367/21, 367/42, 24
See application file for complete search history.

(56) References Cited

U.S. PATENT DOCUMENTS

| | | | | |
|---|---|---|---|---|
| 5,148,406 A | * | 9/1992 | Brink et al. | 367/22 |
| 6,493,636 B1 | * | 12/2002 | DeKok | 367/24 |
| 6,775,618 B1 | * | 8/2004 | Robertsson et al. | 367/24 |
| 7,489,590 B2 | * | 2/2009 | Grion | 367/24 |

* cited by examiner

*Primary Examiner* — Ian Lobo

(57) ABSTRACT

A technique includes obtaining pressure data that was acquired by seismic sensors towed as part of a three-dimensional spread of streamers and obtaining particle motion data, which are indicative of particle motion at locations of the sensors. The technique includes estimating cross-line spectra of the pressure data based at least in part on the pressure data, and the technique includes deghosting the particle motion data based at least in part on the estimated cross-line spectra.

19 Claims, 6 Drawing Sheets

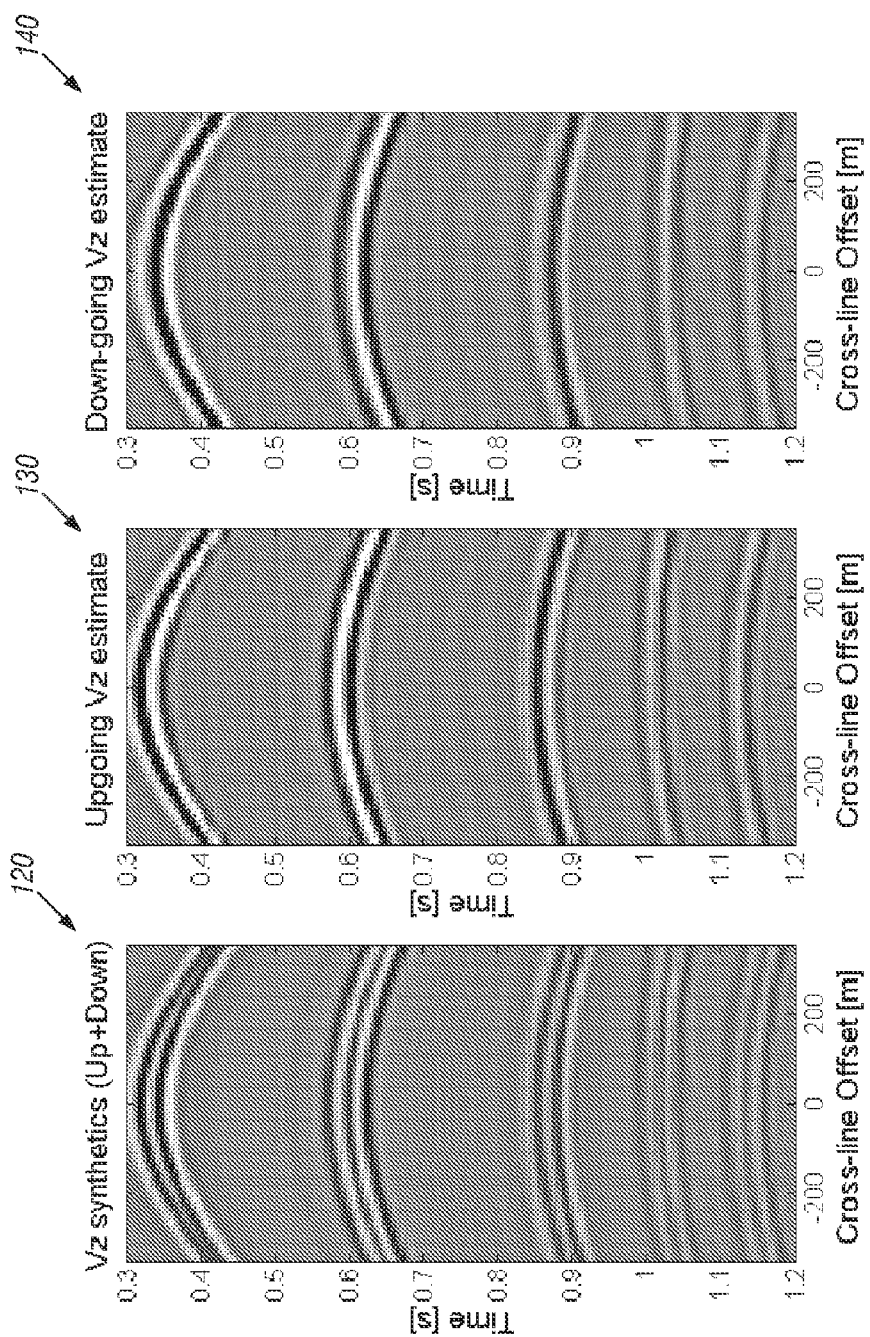

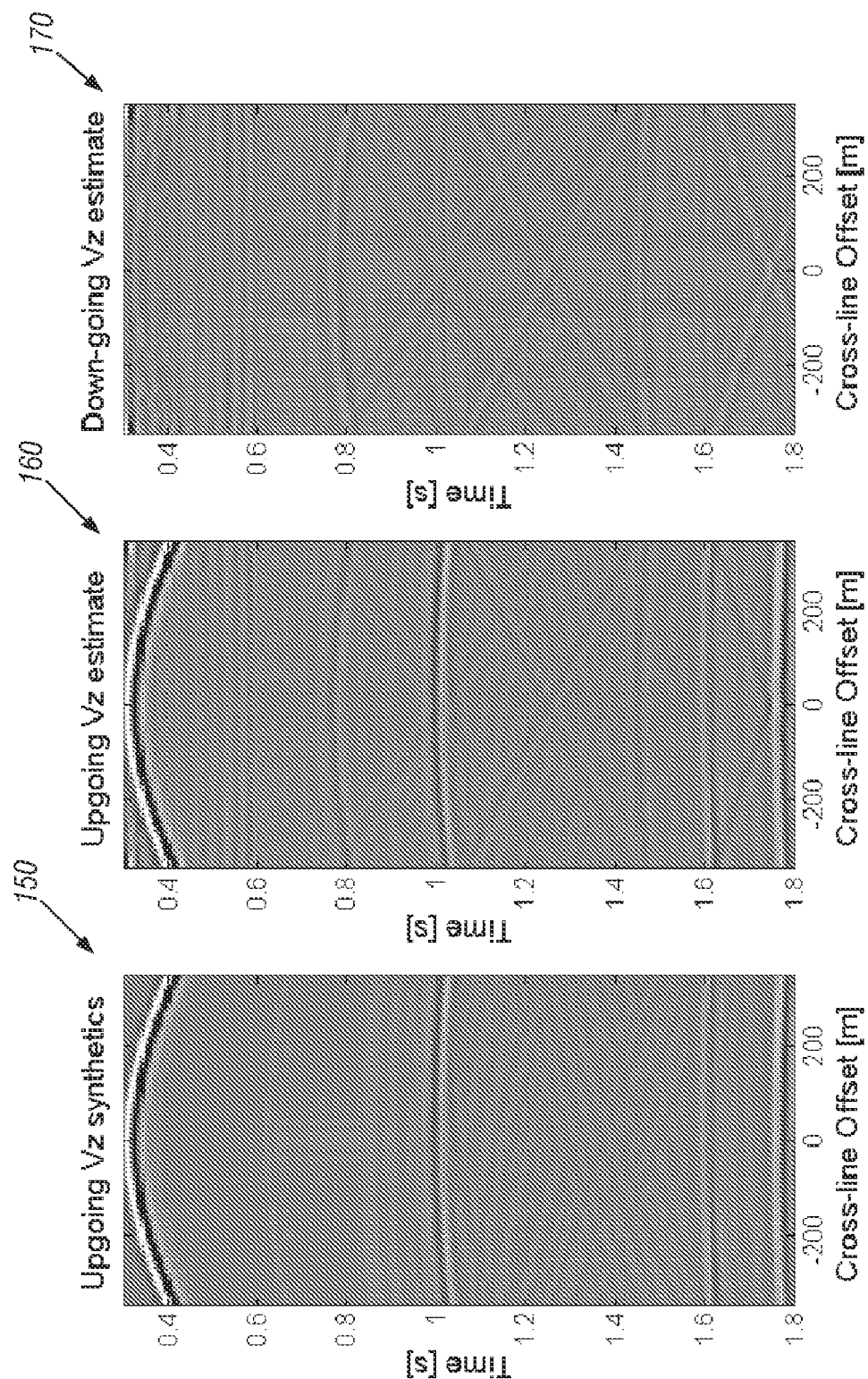

US 8,379,481 B2

3D DEGHOSTING OF MULTICOMPONENT OR OVER/UNDER STREAMER RECORDINGS USING CROSS-LINE WAVENUMBER SPECTRA OF HYDROPHONE DATA

CROSS-REFERENCE TO RELATED APPLICATIONS

This application is a divisional of U.S. patent application Ser. No. 12/169,260 filed on Jul. 8, 2008 which claims the benefit under 35 U.S.C. §119(e) of U.S. Provisional Patent Application Ser. No. 60/971,189 filed on Sep. 10, 2007, both of which are hereby incorporated by reference in their entirety.

BACKGROUND

The invention generally relates to deghosting seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining pressure data acquired by seismic sensors towed as part of a three-dimensional spread of streamers and obtaining particle motion data, which are indicative of particle motion at locations of the sensors. The technique includes estimating cross-line spectra of the pressure data based at least in part on the pressure data, and the technique includes deghosting the particle motion data based at least in part on the estimated cross-line spectra.

In another embodiment of the invention, a system includes an interface and a processor. The interface receives pressure data acquired by seismic sensors towed as part of a three-dimensional spread of streamers and also receives particle motion data that is indicative of particle motion at locations of the sensors. The processor is adapted to estimate cross-line spectra of the pressure data based at least in part on the pressure data, and the processor is adapted to deghost the particle motion data based at least in part on the estimated cross-line spectra.

In yet another embodiment of the invention, an article includes a computer accessible storage medium that stores instructions that when executed by a processor-based system cause the processor-based system to obtain pressure data and particle motion data acquired by seismic sensors towed as part of a three-dimensional spread of streamers and also obtain particle motion data indicative of particle motion at locations of the sensors. The instructions when executed cause the processor-based system to estimate cross-line spectra of the pressure data based at least in part on the pressure data. The instructions when executed also cause the processor-based system to deghost the particle motion data based at least in part on the estimated cross-line spectra.

Advantages and other features of the invention will become apparent from the following drawing, description and claims.

BRIEF DESCRIPTION OF THE DRAWINGS

FIGS. 4, 5, 6, 7, 8 and 9 depict results obtained by applying deghosting techniques to synthesized data in accordance with embodiments of the invention.

DETAILED DESCRIPTION

Figure 1:
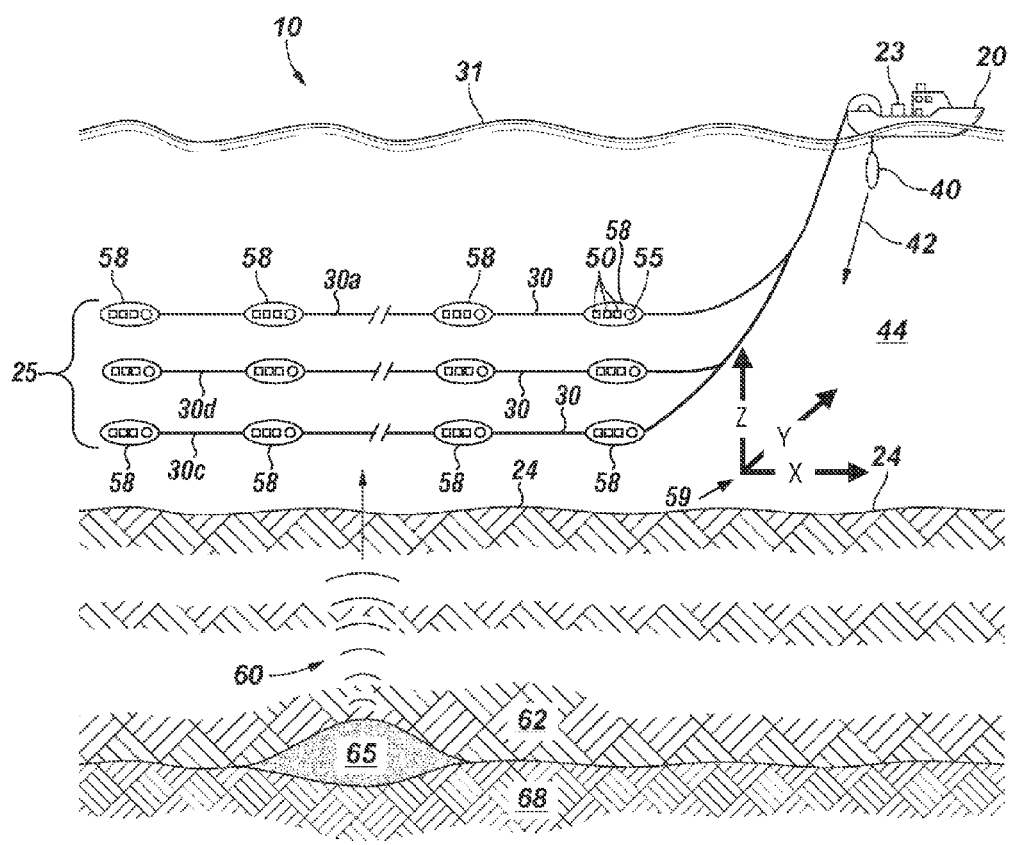
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows a three-dimensional (3-D) spread 25 of seismic streamers 30 (streamers 30a, 30b and 30c being depicted as examples) behind the vessel 20. It is noted that the spread 25 may contain more than the three depicted streamers 30a, 30b and 30c. However, the streamers 30a, 30b and 30c illustrate the 3-D configuration: two streamers 30b and 30c are towed at the same depth, and the other streamer 30a is towed at a more shallow depth. Each seismic streamer 30 may be several thousand meters long and may contain various support cables (not shown), as well as wiring and/or circuitry (not shown) that may be used to support communication along the streamer 30.

Each seismic streamer 30 also contains seismic sensors, which record seismic signals. In accordance with some embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (in-line (x), cross-line (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 10:
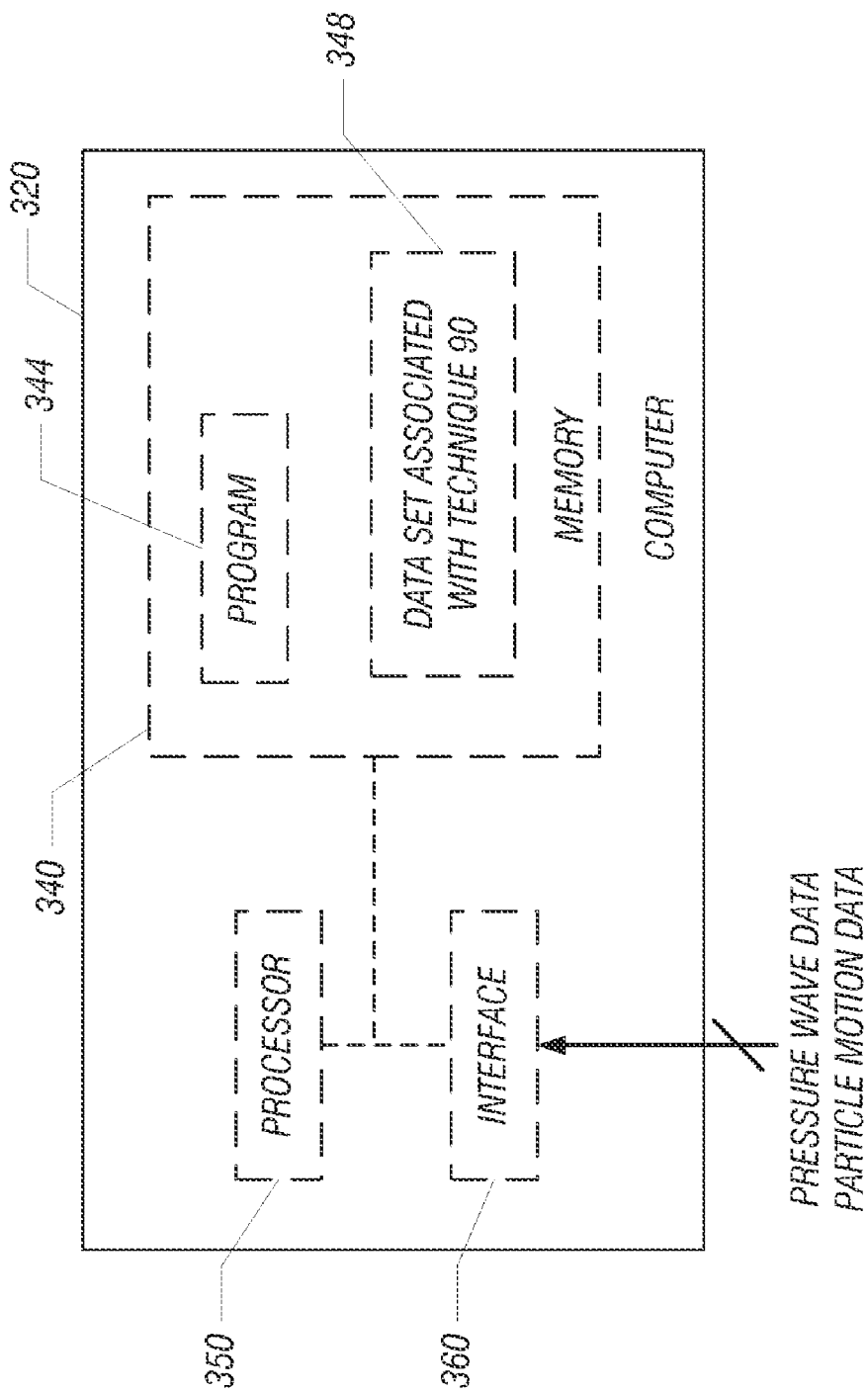
FIG. 10 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 10 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The particle motion data set that is provided by the multi-component seismic sensors 58 allows the recovery of "ghost" free data, which means data indicative of the upgoing wavefield.

In addition to providing the ability to remove surface ghosts, the multi-component data also permits the interpolation of the pressure data in the cross-line direction (i.e., along the y axis) by using the fact that the cross-line component of the particle velocity (called "$V_y$") is proportional to the cross-line gradient of the pressure (P). Exemplary techniques of using multi-component seismic data for purposes of cross-line interpolation are described in PCT Publication No. WO 2005/114258 A1 entitled, "Interpolation and Extrapolation Method for Seismic Recordings," which was published on Dec. 1, 2005.

Conventional deghosting solutions typically ignore three-dimensional (3-D) effects. More specifically, the seismic data set is assumed to be acquired with a shot in-line with the streamer or is pre-processed to satisfy this criterion. In reality, however, the 3-D effects may be significant due to such factors as the 3-D acquisition geometry; significant cross-line variation in the earth's sub-surface; a rough sea surface that is not corrugated but varies in the cross-line direction; or noise or seismic interference that arrives in the cross-line direction.

Techniques are described herein, which use sensor data acquired by a 3-D spread of streamers and which account for the 3-D effects. These techniques process particle motion data, which is either directly acquired by the 3-D spread of streamers or estimated from acquired pressure data, as further described below. The particle motion data are assumed below to be data indicative of the three components of the particle velocity vector: an in-line component (herein called "$V_x$"); a cross-line component (called "$V_y$"); and a vertical component (called "$V_z$"). As depicted by the axes 59 of FIG. 1, the z, or vertical, direction points in an upward direction toward the sea surface; the x, or in-line, direction is in line with the streamer 30; and the y, or cross-line direction, is orthogonal to and located in the same plane as the x axis. It is noted that the deghosting techniques that are disclosed herein may be used with other types of particle motion data, such as accelerometer data (as an example), in accordance with other embodiments of the invention, as many variations are contemplated and are within the scope of the appended claims.

The 3-D deghosting techniques that are described herein deghost the vertical component of the particle velocity (i.e., "$V_z$") at the locations of the multi-component or over/under streamers, which record at least the pressure (called "P") and the vertical component of the particle velocity ("$V_z$") but also may record the cross-line component of the particle velocity ("$V_y$").

In general, the deghosting of wavefield decomposition, into up and down going constituents may be achieved by solving the following equation:

$$V_z^U(f, k_x, k_y) = \frac{1}{2}V_z(f, k_x, k_y) + \frac{q(f, k_x, k_y)}{2\rho}P(f, k_x, k_y), \quad \text{Eq. 1}$$

where "$k_x$" represents the in-line wavenumber; "$k_y$" represents the cross-line wavenumber; "f" represents frequency; "$V_z(f, k_x, k_y)$" represents the recorded or estimated vertical component of the particle velocity in the frequency-wavenumber domain; "$P(f, k_x, k_y)$" represents the recorded pressure; "$p$" represents the density in the recording medium; and "$V_z^U(f, k_x, k_y)$" represents the desired up-going component of the vertical particle velocity (the deghosted data). Also, in Eq. 1, the term "$q(f, k_x, k_y)$" is an unsigned vertical slowness expression, which represents a filtering factor that is applied to the recorded pressure $P(f, k_x, k_y)$. The $q(f, k_x, k_y)$ filtering factor is described as follows:

$$q(f, k_x, k_y) = \sqrt{(2\pi/c)^2 - k_x^2 - k_y^2}/2\pi f, \qquad \text{Eq. 2}$$

where "$c$" represents the velocity of the recording medium.

Eq. 1 may be alternatively expressed in the (t, x, y) domain as follows:

$$V_z^U(t, x_i, y_j) = \qquad \text{Eq. 3}$$
$$\frac{1}{2} V_z(t, x_i, y_j) + IFT\left[\frac{q(f, k_x, k_y)}{2\rho} P(f, k_x, k_y)\right](t, x_i, y_j)$$

where "IFT[ ... ](t, $x_i$, $y_j$)" denotes Inverse Fourier Transform over frequency; "$k_x$" and "$k_y$" are evaluated at time t; "$x_i$" represents the discrete inline coordinate; and "$y_j$" represents the discrete crossline coordinate $y_j$. Note that in deriving Eq. 3, the linearity property of the Fourier transform is used. Also, the IFT on the right hand side of Eq. 3 may be evaluated it at any desired output location. This means that the IFT may be evaluated at those locations at which the vertical component of particle velocity has been sampled. Typically, as explained below, the vertical component is sampled densely along 1D inlines, but not in the crossline direction. Thus, Eq. 3 shows that the available Vz measurements, however few and however limited in their sampling, can be correctly deghosted provided the pressure measurements are sufficiently densely sampled in 3D. This is explained in more detail below.

Because the terms on the right-hand side of Eq. 1 typically are not available with the same crossline bandwidth, an inverse Fourier transform of the 3-D filtered pressure P data to the (t, x, y) domain to the two dimensional (2-D) set of points where $V_z$ is measured may be made.

In the following, 3-D sampling of a wavefield and 3D deghosting of a wavefield is distinguished. A 3-D-sampled wavefield means a set of measurements of a primary wavefield quantity (e.g., pressure or a component of the particle velocity vector) that is sampled in time and that substantially samples a plane (here taken to be the horizontal). Alternatively, a 3-D-sampled wavefield means a set of measurements of a primary wavefield quantity that is sampled in time, together with a first- and/or higher-order spatial derivative of that quantity, sampled in time, in two non-parallel directions (here taken to be the horizontal). Finally, a 3D-sampled wavefield means a set of measurements of a primary wavefield quantity that is sampled in time and that substantially samples a line in one direction (e.g., the inline direction), together with a first- and/or higher-order spatial derivative of that quantity in a perpendicular (non-parallel) direction (e.g., the crossline direction). As described in the following, first- and/or higher-order spatial derivatives of a primary wavefield quantity constitute information about the spatial dependence of that primary wavefield quantity or equivalently its (horizontal) wavenumber spectrum and can, e.g., through interpolation, extrapolation or a matching pursuit approach to some degree replace the need or alleviate the requirements for additional sampling away from that primary wavefield quantity in the direction of the spatial derivative.

Three-dimensional sampling of a wavefield is to be contrasted with 3-D deghosting of a wavefield. 3D-deghosting of a wavefield means correctly taking into account all directional dependence of the wavefield in the deghosting process. Thus, it implies a sufficiently accurate performance of the deghosting process regardless of the direction the waves are scattered from. Mathematically, 3D-deghosting means that the quantities to which all spatial filtering depending on two (horizontal) directions is applied are 3D-sampled. Note that this does not imply that the quantity to be deghosted is 3D-sampled. For example in Eq. 1, spatial filtering (with q) is done only on the pressure recording. This means that to 3D-deghost Vz, only the pressure has to be 3D-sampled in accordance with the two definitions above. Thus, in principle, we could 3D-deghost a single isolated Vz sensor, provided it is flanked by 3D-sampled pressure measurements to which all spatial filtering is applied.

Figure 3:
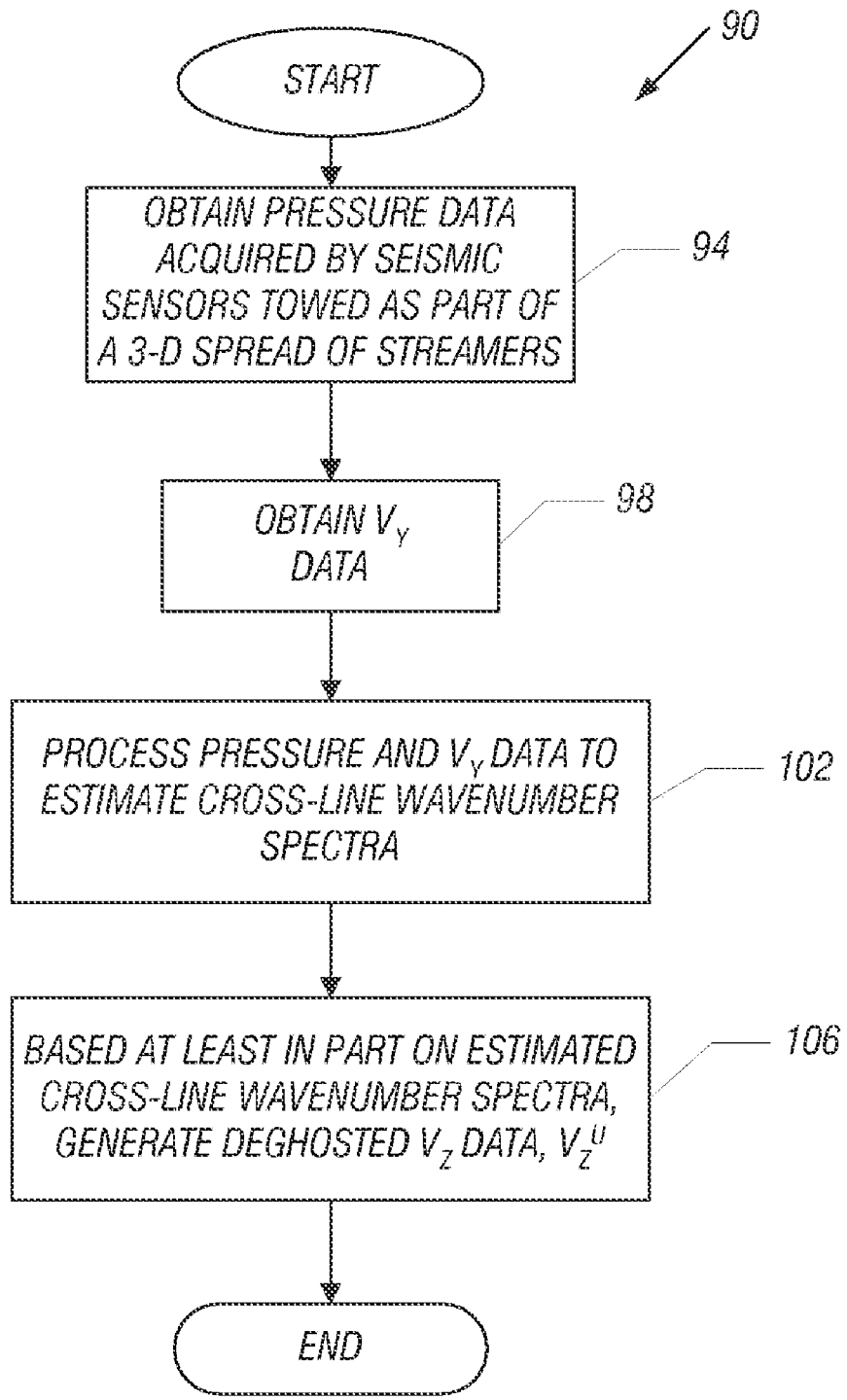
FIG. 3 is a flow diagram depicting a technique to deghost particle motion data according to an embodiment of the invention.

Based on Eq. 1, if the frequency and wavenumber spectrum of the pressure data P in the horizontal plane that contains the 3-D seismic spread of streamers is known, then the recorded component $V_z(f, k_x, k_y)$ of the particle velocity may be deghosted. The deghosting of the $V_z(f, k_x, k_y)$ component may follow a technique 90 that is depicted in FIG. 3. Pursuant to block 94 of the technique 90, the pressure data is acquired by the 3-D spread of streamers, and the $V_z$ data are obtained (either estimated from the pressure data or directly acquired from particle motion sensors of the 3-D spread of streamers). Additionally, the cross-line particle velocity data $V_y$ may be obtained, pursuant to block 98. The cross-line particle velocity data $V_3$, may be directly acquired by particle motion sensors of the 3-D spread of streamers or may be estimated, as further described below. The pressure data and possibly the $V_y$ data are processed to estimate the cross-line wavenumber spectra (block 102), a spectra that includes the cross-line wavenumber $k_y$ and interpolated pressures P between seismic sensor locations. Based at least in part on the estimated cross-line wavenumber spectra, the deghosted $V_z^U$ is generated, pursuant to block 106.

More specifically, the determination of the cross-line spectra yields the cross-line wavenumber $k_y$, which is used in conjunction with the determined in-line wavenumber $k_x$ and the frequency f (both of which may be determined as known to those skilled in the art) to derive the $q(f, k_x, k_y)$ filtering factor that is described in Eq. 2. Once the $q(f, k_x, k_y)$ filtering factor is known, the deghosted vertical component velocity data $V_z^U$ may then be determined pursuant to Eq. 1.

A significant advantage of the technique 90 is that the upgoing Vz data are deghosted in a truly 3-D sense, while the actual Vz, Vy and P measurements are not true 3-D measurements.

This advantage may be better understood by considering the following. All the required spatial filtering (i.e., filters involving terms that are a function of kx, ky, and/or kz) is done on the 3-D pressure data (e.g., obtained by interpolation) only. The total Vz (i.e., the measured or derived quantity) is determined via a simple sum in the (f, kx, ky) domain-formulation of Vz deghosting/decomposition. As the Fourier transform is a linear operation, this summation may be performed in the (t, x, y)-domain just as well as in the (f, kx, ky)-domain. The additional 2-D Vy measurement provides the information about the crossline wavenumber spectrum of the pressure P data, requiring the pressure to be measured at additional locations in between the conventional streamers (i.e., via more densely spaced pressure). Thus, to obtain the equivalent of a truly 3-D sampled pressure, an additional sensor, 2-D Vy measurement may be made instead.

Because the derived Vz measurements do not need to be transformed into the (f, kx, ky)-domain, Vz (or the pressure used to derive Vz) does not need to be measured in a truly 3-D sense. Instead, the spatially filtered 3-D pressure (e.g., obtained by interpolation) data are inverse Fourier transformed back to the (t, x, y)-domain before adding the transformed data to the total Vz (in the t, x, y-domain) at the measurement locations. It quite challenging to truly obtain a 3-D sampling of the pressure. It is generally risky to tow the streamers closer than, about (for example) 50 m. Seismic streamers are essentially very good one dimensional (1-D) antennas (2-D if the temporal dimension is considered) but generally poor antennas in the crossline direction. By adding the 1-D Vy antenna, vital information is obtained about the crossline wavenumber spectrum of the pressure, without having to tow the streamers more densely.

It has been discovered that it is challenging to obtain the crossline derivative of the vertical component of particle motion (e.g., dVz/dy). This (or any measurement proportional to it) is a fundamental missing quantity. dVz/dy would be to Vz what Vy is to P. That is, dVz/dy provides vital extra information about the crossline wavenumber spectrum of Vz. Thus, dVz/dy allows a Vz estimate to be obtained with higher crossline bandwidth and therefore approach a more truly 3-D estimate, without actually towing streamers more densely in the water. The reason why this quantity is desirable is because to 3-D deghost the pressure, the vertical component is 3-D filtered before adding it to the total pressure. There is no way around this other than to tow streamers more closely spaced in the water or build streamers with a high diameter and make a differential Vz measurement to approximate dVz/dy. Such cables with high diameter may be impractical, and such differential measurements may be susceptible to noise.

The techniques that are described herein circumvent this problem by making Vz the fundamental quantity to deghost. To deghost Vz, the pressure P data is filtered, which Vy gives the much desired extra information on the crossline spectra of P. Thus, the crossline spectra allows for truly 3-D filtered P data and hence, truly 3-D upgoing Vz data, without towing the streamers more densely in the water.

In this context, it is also noted that knowledge of truly upgoing 3-D Vz data at some 2-D locations is not equivalent to knowledge of truly 3-D pressure data P at some 2-D locations. Even though for one-way wavefields, the vertical component and the pressure are related by a theoretically simple filtering operation with the vertical wavenumber, kz, the vertical wavenumber is a function of the crossline wavenumber ky. Thus, this 3-D kz filter cannot be applied to upgoing 3-D Vz available at some 2-D locations to obtain 3-D P at those 2-D locations. Vice-versa, even if it were possible to be able to obtain a truly 3D upgoing P (which one cannot for the reasons outlined above) at 2-D locations, a truly 3-D upgoing Vz at those 2-D locations still cannot be obtained as this requires, again, filtering with a 3-D kz filter.

Many different 3-D streamer configurations may be used in accordance with the various embodiments of the invention. A "3-D spread of streamers" in the context of this application refers to a configuration in which all of the streamers do not fall in the same plane (ignoring non-ideal effects, which may cause the streamers to be slanted or otherwise not be aligned as intended during towing). Thus, the 3-D spread of streamers contains at least three streamers, and the streamers are not all towed at the same depth or in an over/under configuration in which the streamers are directly over/under each other.

As examples, there are at least five 3-D streamer spreads that may benefit from the deghosting techniques that are described herein. The first streamer configuration includes a 3-D spread of multi-component streamers, which contain pressure and particle motion sensors (i.e., multi-component sensors) to record the pressure P and the vertical ($V_z$) and cross-line ($V_y$) data. Another configuration is a three-dimensional spread of multi-component streamers in which the pressure P and $V_z$ are recorded. In yet another variation, a 3-D streamer spread includes over/under streamers, which record the pressure P data and in which the vertical component ($V_z$) of the particle velocity is estimated at each over/under pair.

Figure 2:
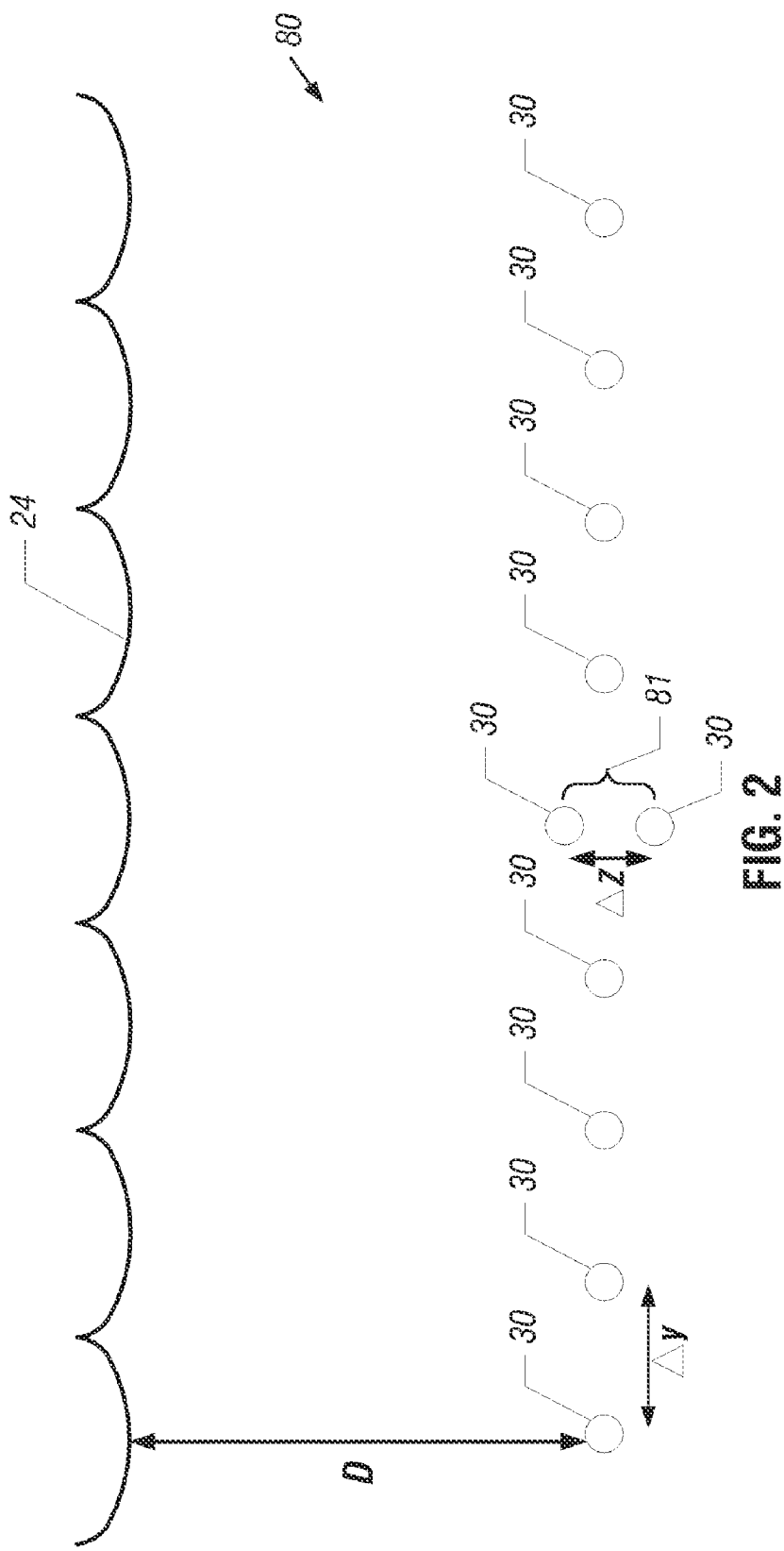
FIG. 2 is an illustration of a three-dimensional spread of streamers according to an embodiment of the invention.

FIG. 2 depicts a 3-D spread 80 of streamers in which all of the streamers 30 except for an over/under pair 81 of the streamers 30 are towed at the same depth. For this configuration, the vertical component ($V_z$) of the particle velocity may be estimated at the location of the over/under pair 81.

As yet another variation, in accordance with some embodiments of the invention, the streamers may be arranged in a 3-D spread of "triplet" over/under streamers (i.e., each triplet containing three streamers directly over/under each other), with each "triplet" recording pressure P data. For this configuration, the vertical component ($V_z$) as well as the crossline component ($V_y$) may be estimated at each over/under triplet.

Other 3-D streamer spreads are contemplated and are within the scope of the appended claims.

The cross-line wavenumber spectra of the pressure P data may be estimated using exemplary iterative and non-iterative techniques that are described below. It is noted, however, that other techniques may be used to estimate the cross-line wavenumber spectra of the pressure P data, in accordance with other embodiments of the invention.

The iterative technique, first described below, interpolates the pressure P data between sensor positions in the cross-line direction and also provides estimates of the cross-line wavenumber spectrum. If the $V_3$, data are available, then the pressure data may be interpolated on a finer cross-line grid. To generalize, the following discusses the cross-line interpolation of a function called "ƒ(x)" (which is the pressure wavefield for the specific application disclosed herein). In general, the function ƒ(x) may be represented by a sum of J sinusoids with amplitudes $A_j$, wavenumbers $k_j$ and phases $\phi_j$ as follows:

$$f(x) = \sum_{j=1}^{J} A_j \cos(2\pi k_j x + \phi_j). \quad \text{Eq. 4}$$

To identify the parameters of the sinusoids, an algorithm called the "Matching Pursuit" algorithm may be used. The Matching Pursuit algorithm is generally disclosed in Mallat, S. G. and Zhang Z., 1993, Matching Pursuits with Time-Frequency Dictionaries, IEEE Trans. On Signal Processing, 41, 3397-3415. This is an iterative algorithm, which is used to expand a signal in terms of a linear combination of a set of waveforms. The set of waveforms used in the representation form a redundant dictionary. In other words, there are more terms in the dictionary than needed for an adequate representation. According to this model of the seismic data, the dictionary in this study consists of a set of sinusoids. The frequencies, amplitudes and phases of sinusoids are to be determined iteratively by using the Matching Pursuit algorithm. At every iteration, a new sinusoid is added to the model and then the modeling error waveform, i.e., the residual, is obtained. The parameters of the sinusoid added to the model are found by optimization by minimizing the energy of the residual. Thus, if P−1 components are determined previously, the representation of the seismic data with only P−1 sinusoids may be described as follows:

$$f^{P-1}(x) = \sum_{j=1}^{P-1} A_j \cos(2\pi k_j x + \phi_j). \quad \text{Eq. 5}$$

The residual in the approximation may be described as follows:

$$r^{P-1}(x) = f(x) - \sum_{j=1}^{P-1} A_j \cos(2\pi k_j x + \phi_j). \quad \text{Eq. 6}$$

If a new expression $A_P \cos(2pk_P x + f_P)$ is added to the model, then the residual becomes the following:

$$r_{P-1}(x) = r^{P-1}(x) - A_P \cos(2\pi k_P x + \phi_P). \quad \text{Eq. 7}$$

Parameters of the new expression may be found by minimizing the energy of the residual on irregular offset locations as described below:

$$(A_P, k_P, \phi_P) = \arg\min_{\overline{A}_P, \overline{k}_P, \overline{\phi}_P} \sum_{k=1}^{L} |r^{P-1}(x) - \overline{A}_P \cos(2\pi k_P x + \phi_P)|^2. \quad \text{Eq. 8}$$

If the new model is expressed as:

$$\overline{A}_p \cos(2\pi \overline{k}_p x_k + \phi_p) = \overline{a}_p \cos(2\pi \overline{k}_p x_k) + \overline{b}_p \sin(2\pi \overline{k}_p x_k), \quad \text{Eq. 9}$$

where $\overline{a}_p$ and $\overline{b}_p$ are defined by $$\overline{A}_p = (\overline{a}_p^2)^{1/2}, \overline{\phi}_p = -\tan^{-1}(\overline{b}_p/\overline{a}_p), \quad \text{Eq. 10}$$

then the cost function becomes linear in $\overline{a}_p$ and $\overline{b}_p$:

$$(a_P, b_P, k_P) = \quad \text{Eq. 11}$$

$$\arg\min_{\overline{A}_p, \overline{k}_p, \overline{\phi}_p} \sum_{k=1}^{L} |r^{P-1}(x_k) - \overline{a}_P \cos(2\pi \overline{k}_p x_k) - \overline{b}_P \sin(2\pi \overline{k}_p x_k)|^2.$$

Hence, sinusoid parameters $\overline{a}_p$ and $\overline{b}_p$ which minimizes the above expression can be solved in terms of the wavenumber $\overline{k}_p$ as follows:

$$\begin{bmatrix} a_p(\overline{k}_P) \\ b_p(\overline{k}_P) \end{bmatrix} = D_P^{-1}(\overline{k_P}) d_P(\overline{k}_p), \quad \text{Eq. 12}$$

where the 2-by-2 matrix $D_P(\overline{k}_p)$ and 2-by-1 vector $\overline{d}_p(\overline{k}_p)$ are defined in terms of the wavenumber $\overline{k}_p$ as follows:

$$D_P(\overline{k}_p) = \begin{bmatrix} \sum_{k=1}^{L} \cos^2(2\pi \overline{k}_p x_k) & \sum_{k=1}^{L} \sin(4\pi \overline{k}_p x_k)/2 \\ \sum_{k=1}^{L} \sin(4\pi \overline{k}_p x_k)/2 & \sum_{k=1}^{L} \sin^2(2\pi \overline{k}_p x_k) \end{bmatrix}, \text{and} \quad \text{Eq. 13}$$

$$d_P(\overline{k}_p) = \begin{bmatrix} \sum_{k=1}^{L} r^{P-1}(x_k)\cos(2\pi \overline{k}_p x_k) \\ \sum_{k=1}^{L} r^{P-1}(x_k)\sin(2\pi \overline{k}_p x_k) \end{bmatrix}. \quad \text{Eq. 14}$$

Once the optimal value of $\overline{a}_p$ and $\overline{b}_p$ are substituted into Eq. 10, the optimization problems simplifies to the following:

$$k_P = \arg\min_{\overline{k}_P} \left\{ \sum_{k=1}^{L} |r^{P-1}(x_k)|^2 - g_P^T(\overline{k}_P) G_P^{-1}(\overline{k}_P) g_P(\overline{k}_P) \right\}, \quad \text{Eq. 15}$$

which can be alternatively posed as a maximization problem:

$$k_P = \arg\min_{\overline{k}_P} \{ g_P^T(\overline{k}_P) G_P^{-1}(\overline{k}_P) g_P(\overline{k}_P) \}. \quad \text{Eq. 16}$$

It can be shown that the objective function $g_P^T(\overline{k}_p)G_P^{-1}(\overline{k}_p)g_P(\overline{k}_p)$ is the same as the Lomb spectrum, which is widely used especially in astronomy to compute the spectrum of non-uniformly sampled time-series. Thus, the wavenumber $\overline{k}_p$ is estimated by computing the Lomb spectrum and choosing the wavenumber corresponding to the largest peak.

Since the Lomb spectrum provides a fairly good estimate of the dominant peak locations, it is conceivable to estimate several dominant wavenumbers by Eq. 16 and use these dominant wavenumbers to identify parameters of several sinusoidal components by using Eq. 12. As several sinusoidal components would be identified at each iteration, the convergence rate of the algorithm would be significantly improved with negligible increase in the computational complexity. The same wavenumber can be identified as a dominant peak at later iterations; therefore any error introduced by this type of an approach can be corrected at later stages.

For purposes of interpolating the gradient data, the gradient may be described as follows:

$$f'(x) = -\sum_{j=1}^{J} A_j 2\pi k_j \sin(2\pi k_j x + \phi_2). \quad \text{Eq. 17}$$

Because there are two sets of measurements, it is conceivable to determine the model parameters by minimizing a mixture of fit errors to both sets of measurements. For instance, if the parameters of the sinusoids up to order P−1 are determined, then the parameters of the sinusoid of order P can be determined by minimizing a weighted sum of the residual energies for data and gradient as described below:

$$(A_P, k_P, \phi_P) = \quad \text{Eq. 18}$$

$$\arg\min_{\overline{A}_P, \overline{k}_P, \overline{\phi}_P} \left\{ \sum_{k=1}^{L} |r^{P-1}(x_k) - \overline{A}_P \cos(2\pi \overline{k}_P x_k + \overline{\phi}_P)|^2 + \lambda \sum_{k=1}^{L} |(r^{P-1})'(x_k) + \overline{A}_P 2\pi k_P \sin(2\pi \overline{k}_P x_k + \overline{\phi}_P)|^2 \right\},$$

where "$\bar{A}_P \cos(2p\bar{k}_p x_k + \bar{f}_p)$" is the new model term, "$(r^{P-1})(x)$" is the gradient of the residual given in Eq. 16 and l is weighting parameter which also accounts for difference of units between data and gradient measurements. If the new model term is expressed as shown in Eq. 9, then the model parameters $\bar{a}_p$ and $\bar{b}_p$ are obtained as follows:

$$\begin{bmatrix} a_P(\bar{k}) \\ b_P(\bar{k}_P) \end{bmatrix} = (D_P(\bar{k}_P) + \lambda G_P(\bar{k}_P))^{-1}(d_P(\bar{k}_P) + \lambda g_P(\bar{k}_P)), \quad \text{Eq. 19}$$

where $\bar{D}_P(\bar{k}_p)$, $d_P(\bar{k}_p)$ are given in Eqs. 13 and 14, and $G_P(\bar{k}_p)$, $g_P(\bar{k}_p)$ are defined in terms of the wavenumber $\bar{k}_p$ as follows:

$$G_P(\bar{k}_p) = \begin{bmatrix} 4\pi^2 \bar{k}_P^2 \sum_{k=1}^{L} \sin^2(2\pi \bar{k}_p x_k) & -2\pi^2 \bar{k}_P^2 \sum_{k=1}^{L} \sin(4\pi \bar{k}_p x_k) \\ -2\pi^2 \bar{k}_P^2 \sum_{k=1}^{L} \sin(4\pi \bar{k}_p x_k)/2 & 4\pi^2 \bar{k}_P^2 \sum_{k=1}^{L} \cos^2(2\pi \bar{k}_p x_k) \end{bmatrix}, \quad \text{Eq. 20}$$

$$g_P(\bar{k}_p) = \begin{bmatrix} -2\pi^2 \bar{k}_P^2 \sum_{k=1}^{L} r^{P-1}(x_k)\sin(2\pi \bar{k}_p x_k) \\ 2\pi^2 \bar{k}_P^2 \sum_{k=1}^{L} (r^{P-1})'(x_k)\cos(2\pi \bar{k}_p x_k) \end{bmatrix}. \quad \text{Eq. 21}$$

Thus, substituting $\bar{a}_p$ and $\bar{b}_p$ into Eq. 17 and simplifying the resulting equation, the 3-Dimensional minimization problem in Eq. 17 can be transformed into a 1-Dimensional maximization problem as described below:

$$k_P = \underset{\bar{k}_P}{\mathrm{argmax}}\{(d_P(\bar{k}_P) + \lambda g_P(\bar{k}_P))^T (D_P(\bar{k}_P) + \lambda G_P(\bar{k}_P))^{-1}(d_P(\bar{k}_P) + \lambda g_P(\bar{k}_P))\}, \quad \text{Eq. 22}$$

This problem is non-linear in $\bar{k}_p$. Therefore, the wavenumber domain may be searched to find the optimal $\bar{k}_p$. Note that computation of the objective function given in Eq. 21 has the same order of complexity as that for non-uniform Fourier transform.

As an alternative, the non-iterative technique may be used to determine the cross-line spectra of P. The non-iterative technique, which is set forth below, uses a linear system equation that is solved for the cross-line spectra.

Suppose that seismic data are bandlimited to $\sigma$ and approximately space-limited to the offsets $[0,)L-1)\sigma$] and L samples of signal $f(x_k)$ and its gradient $f'(x_k)$ are measured on nonuniformly spaced offsets $x_k$. The objective is to compute the values of the signal and its gradient at regularly spaced offsets $y_m = m/\sigma$. For this case, a multichannel sampling theorem may be written as follows:

$$f(x_k) = \sum_{m=0}^{L/2-1} \{f(2m/\sigma) + (x_k - 2m/\sigma)f'(2m/\sigma)\} \times \mathrm{sinc}^2(\sigma x_k/2 - m), \quad \text{Eq. 23}$$

$$k = 1, \ldots, L$$

Since there are L equations and L unknowns, the data and gradient samples on uniform offsets can be solved in terms of the data samples on non-uniform offsets. However, to make use of the gradient measurements, a new set of equations is set forth below, which relates the gradient values at irregular offsets to signal and gradient values at regular offsets. This new set of equations may be obtained by term-by-term differentiation of Eq. 23, which yields the following expression:

$$f'(x_k) = \sum_{m=0}^{L/2-1} 2\frac{\mathrm{sinc}(\sigma x_k - 2m) - \mathrm{sinc}^2(\sigma x_k/2 - m)}{x_k - /2m/\sigma} f(2m/\sigma) \times \quad \text{Eq. 24}$$

$$[\mathrm{sinc}(\sigma x_k - 2m) - \mathrm{sinc}^2(\sigma x_k/2 - m)]f'(2m/\sigma),$$

$$k = 1, \ldots, L$$

By using the matrix notation, these two sets of equations may be written as follows:

$$\begin{bmatrix} h \\ h' \end{bmatrix} = \begin{bmatrix} S_{11} & S_{12} \\ S_{22} & S_{22} \end{bmatrix} \begin{bmatrix} g \\ g' \end{bmatrix} \Rightarrow \mathfrak{h} = \mathfrak{S}\mathfrak{g}, \quad \text{Eq. 25}$$

where the entries of the L-by-L/2 submatrices $S_{11}$, $S_{12}$, $S_{21}$ and $S_{22}$ are given as follows:

$$S_{11}(k,m) = \sin c^2(\sigma x_k/2 - m) \quad \text{Eq. 26}$$

$$S_{12}(k,m) = (x_k - 2m/\sigma)\sin c^2(\sigma x_k/2 - m) \quad \text{Eq. 27}$$

$$S_{21}(k,m) = 2\frac{\mathrm{sinc}(\sigma x_k - 2m) - \mathrm{sinc}^2(\sigma x_k/2 - m)}{x_k - 2m/\sigma}; \text{ and} \quad \text{Eq. 28}$$

$$S_{22}(k,m) = 2 \sin c(\sigma x_k - 2m) - \sin c^2(\sigma x_k/2 - m); \quad \text{Eq. 29}$$

for $1 \leq k \leq L$, $0 \leq m \leq L/2-1$.

The entries of L-dimensional vectors h, h', g and g' are given as follows:

$$g(m) = f(2m/\sigma), \quad \text{Eq. 30}$$

$$g'(m) = f'(2m/\sigma), \quad \text{Eq. 31}$$

$$h(x_k) = f(x_k) \quad \text{Eq. 32}$$

$$h'(x_k) = f'(x_k), \quad \text{Eq. 33}$$

for $1 \leq k \leq L$, $0 \leq m \leq L/2-1$.

Since the dimension of $\mathfrak{S}$ is 2L-by-L, the equations above set forth an over-determined linear system of equations. Thus, Eq. 25 may be solved for data and gradient samples at uniformly spaced offsets by using a regularized least squares inversion:

$$\bar{\mathfrak{g}} = (\mathfrak{S}^T W_1 \mathfrak{S} + W_2)^{-1} \mathfrak{S}^T W_1 \bar{\mathfrak{h}} \quad \text{Eq. 34}$$

where "$W_2$" may be usually chosen as a small multiple of identity matrix, i.e., $W_2 = \epsilon^2 I$, and $W_1$ is chosen as a diagonal matrix. Once the regular samples with $2m/\sigma$ spacing are computed, the multichannel sampling theorem that is set forth below may be used to compute data samples at any arbitrary location, as described below:

$$f(x) = \sum_{m=-\infty}^{\infty} \{f(2m/\sigma) + (x - 2m/\sigma)f'(2m/\sigma)\}\mathrm{sinc}^2(\sigma x/2 - m). \quad \text{Eq. 35}$$

If seismic data are aliased up to twice the Nyquist wavenumber, i.e., $2\sigma$, regularization of seismic data is still possible due to the availability of the gradient measurements. In this case, the multichannel sampling theorem for seismic data and gradient may be expressed as follows:

$$f(x_k) = \sum_{m=0}^{L/2-1} \{f(m/\sigma) + (x_k - m/\sigma)f'(m/\sigma)\}\mathrm{sinc}^2(\sigma x_k/2 - m), \quad \text{Eq. 36}$$

and $$f'(x_k) = \sum_{m=0}^{L/2-1} 2\frac{\mathrm{sinc}(2\sigma x_k - 2m) - \mathrm{sinc}^2(\sigma x_k - m)}{(x_k - m/\sigma)} f(2m/\sigma) \times \quad \text{Eq. 37}$$
$$[2\mathrm{sinc}(2\sigma x_k - 2m) - \mathrm{sinc}^2(\sigma x_k - m)] f'(m/\sigma),$$
$$k = 1, \ldots, L/2$$

By using the matrix notation, Eqs. 35 and 36 may be written as follows:

$$\begin{bmatrix} \overline{h} \\ \overline{h}' \end{bmatrix} = \begin{bmatrix} \overline{S}_{11} & \overline{S}_{12} \\ \overline{S}_{22} & \overline{S}_{22} \end{bmatrix} \begin{bmatrix} \overline{g} \\ \overline{g}' \end{bmatrix} \Rightarrow \overline{\mathfrak{h}} = \overline{\mathfrak{G}}\,\overline{\mathfrak{g}}, \quad \text{Eq. 38}$$

where the entries of the L/2-by-L/2 submatrices $\overline{S}_{11}, \overline{S}_{12}, \overline{S}_{21}$ and $\overline{S}_{22}$ are given as follows:

$$\overline{S}_{11}(k,m) = \mathrm{sinc}^2(\sigma x_k - m); \quad \text{Eq. 39}$$

$$S_{12}(k,m) = (x_k - m/\sigma)\mathrm{sinc}^2(\sigma x_k - m); \quad \text{Eq. 40}$$

$$\overline{S}_{21}(k,m) = 2\frac{\mathrm{sinc}(2\sigma x_k - 2m) - \mathrm{sinc}^2(\sigma x_k - m)}{x_k - 2m/\sigma}; \quad \text{Eq. 41}$$

$$\overline{S}_{22}(k,m) = 2\,\mathrm{sinc}(2\sigma x_k - 2m) - \mathrm{sinc}^2(\sigma x_k - m); \quad \text{Eq. 42}$$

for $1 \leq k \leq L$, $0 \leq m \leq L/2 - 1$.

The entries of L/2-dimensional vectors $\overline{h}, \overline{h}', \overline{g}$ and $\overline{g}'$ are given as follows:

$$\overline{g}(m) = f(m/\sigma), \quad \text{Eq. 43}$$

$$\overline{g}(m) = f'(m/\sigma), \quad \text{Eq. 44}$$

$$\overline{h}(x_k) = f(x_k), \text{ and} \quad \text{Eq. 45}$$

$$\overline{h}'(x_k) = f'(x_k). \quad \text{Eq. 46}$$

Because there are L equations and L unknowns, the system of equations set forth above may be solved for seismic data and gradient samples at uniformly spaced locations. In cases where the system of equations is not well conditioned, a regularized inversion may be performed as set forth below:

$$\overline{\mathfrak{g}} = (\overline{G}^T W_1 \overline{G} + W_2)^{-1} \overline{G}^T W_1 \overline{\mathfrak{h}}, \quad \text{Eq. 47}$$

where $W_2$ is usually chosen as a small multiple of identity matrix, i.e., $W_2 = \epsilon^2 I$; and $W_1$ is chosen as a diagonal matrix. Once the regular samples with $m/\sigma$ spacing are computed, the multichannel sampling theorem set forth in Eqs. 36 and 37 may be used to compute data samples at any arbitrary location.

To demonstrate the effectiveness of the 3-D deghosting techniques that are set forth herein, an experiment was simulated using a 3D spread of multicomponent streamers, recording P, Vz and Vy data. For this simulation, the maximum cross-line offset is 350 m, and the spacing between streamers is 50 m. The depth of the streamers is 15 m. The synthetics contain both, upgoing and down going events.

The multicomponent interpolation applied the iterative data regularization technique that is described above to pressure P and Vy data. The technique produced a 3-D realization of the pressure P data on a finer cross-line grid, characterized by 12.5 m spacing.

Eqs. 1 and 2 were then applied in order to obtain the desired 3-D separated upgoing and down going Vz data.

FIGS. 4, 5 and 6 depict the results of the simulation. More specifically, FIG. 4 depicts the total $V_z$ wavefield, FIG. 5 depicts the estimated upgoing $V_z$ wavefield (i.e., the deghosted data). FIG. 6 depicts the down going $V_z$ wavefield, which is estimated as the difference between the total and the upgoing $V_z$ estimate.

Another experiment was conducted using the same configuration as the first example set forth above, but the synthetics (P, Vy, Vz) were characterized by only upgoing events (i.e., an absorption free surface).

In this case, the ideal result should be an upgoing Vz estimate that is the same as the upgoing Vz synthetics. Once again, multi-channel interpolation of P was performed, using P and Vy as input, to obtain a 3-D pressure wavefield. Eqs. 1 and 2 were applied to estimate the upgoing Vz from the pressure.

FIGS. 7, 8 and 9 depicts the results of the second experiment. In particular, FIG. 7 depicts an ideal upgoing $V_z$ wavefield 150. FIG. 8 depicts the upgoing $V_z$ wavefield 160, which is estimated through application of the techniques that are described herein. FIG. 9 depicts the downgoing $V_z$ wavefield estimated as the difference between the total wavefield and the upgoing estimate. It is noted that the wavefield 170 should be zero, and as depicted in FIG. 9, the residual results are satisfactorily low.

Three-dimensional deghosted data have a number of applications in time-lapse seismic monitoring and complex imaging. One application of particular interest is multiple removal, as described in UK Patent Application No. GB 2406645, entitled "Processing Seismic Data," which was filed on May 27, 2003, and which published on Apr. 6, 2005.

Described below is an exemplary application of 3-D deghosted data for purposes of removing multiples. It is assumed that the data have been recorded in two surveys repeating source and receiver locations, and it is assumed that the two surveys took place in two different tidal or sea states. It is further noted that the receiver positions for the two surveys are at an identical vertical distance with respect to the seafloor and not the sea surface. It is also assumed that the data have been 3-D deghosted on the receiver side (using the techniques that are disclosed herein) and that differences in source signatures or propagation on the source side (including static source shifts and ghost reflections) have been accounted for properly. Surface-related multiples interact with the sea-surface more than once, and this interaction is different and predictable in the two repeat surveys.

It is also assumed that the direct wave has been removed. The equations may be modified to account for cases where the direct wave is present. The up/down separated (3-D deghosted) data on the receiver side from survey i (i=1, 2) may be written as follows:

$$U_i = P + M_i, \text{ and} \quad \text{Eq. 48}$$

$$D_i = G_i P + G_i M_i, \quad \text{Eq. 49}$$

where "$U_i$" represents the up-going wavefield, "$D_i$" represents the down going wavefield, "P" represents the primaries, "Mi" represents the first-order surface-related multiples and "$G_i$" represents the surface-related ghost relative to the receiver array. By subtracting the up/down separated data from the two surveys the following expression is obtained:

$$U_1 - U_2 = M_1 - M_2. \quad \text{Eq. 50}$$

The first-order surface-related multiples have suffered one additional ghost reflection, as described below:

$$0 = G_2 M_1 - G_1 M_2, \quad \text{Eq. 51}$$

The down-going wavefield may be predicted from the up-going wavefield as follows:

$$D_1 = G_1 U_1, \text{ and} \quad \text{Eq. 52}$$

$$D_2 = G_2 U_2. \quad \text{Eq. 53}$$

Equations 50-53 yield an expression for the first-order surface-related multiples in the first survey, as described below:

$$M_1 = \frac{U_2 D_1 (U_1 - U_2)}{U_2 D_1 - U_1 D_2}. \quad \text{Eq. 54}$$

The result from applying Eq. 53 to the recorded data may then be adaptively subtracted from the recorded data in the first survey to yield a data set without first-order surface-related multiples (Eqs. 47 and 48).

The acquisition geometry depicted in FIG. 2 may be particularly suitable for multiple removal for a 2-D seismic line. It consists of a spread of ordinary streamers towed densely together (perhaps a cross-line separation of 25 to 30 m, for example) at a depth D that can be somewhat arbitrary chosen (e.g., D=25 m). In the middle (or at a different position) of the spread, the over/under pair 81 (see FIG. 2) where the vertical separation $\Delta z$ is chosen so that Vz may be estimated using CDF techniques, as further described in UK Patent Application No. GB 2406645. $\Delta z$ can typically be 5 to 7 m.

Referring to FIG. 10, in accordance with some embodiments of the invention, a seismic data processing system 320 may perform at least part of the techniques that are disclosed herein for purposes of deghosting particle motion data, and the system 320 may be used to perform at least part of the techniques that are described herein for multiple removal. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to pressure and particle motion measurements. Thus, in accordance with embodiments of the invention described herein, the processor 350, when executing instructions stored in a memory of the seismic data processing system 320, may receive multi-component data that is acquired by multi-component seismic sensors while in tow. It is noted that, depending on the particular embodiment of the invention, the multi-component data may be data that is directly received from the multi-component seismic sensor as the data is being acquired (for the case in which the processor 350 is part of the survey system, such as part of the vessel or streamer) or may be multi-component data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various data sets involved with the techniques 90, 100 and/or 150, as indicated by reference numeral 348. The memory 340 may store program instructions 344, which when executed by the processor 350, may cause the processor 350 to perform one or more of the techniques that are disclosed herein, such as the technique 90 (as an example), as indicated by reference numeral 348 and display results obtained via the technique(s) on a display (not shown in FIG. 10) of the system 320, in accordance with some embodiments of the invention.

As can be appreciated by one of skill in the art, estimating the cross-line wavenumber spectrum is implicit in the presented crossline interpolation/regularization algorithms and for the purposes of the techniques that are described herein, the estimation of the cross-line wavenumber spectrum should be understood as equivalent to cross-line interpolation/regularization. Thus, in an alternative embodiment, the pressure data may be interpolated to a denser set of measurements in the crossline direction using said interpolation algorithms (thereby implicitly estimating the crossline wavenumber spectrum), and filtered (e.g., in the f, x, y-domain) using an approximation of the filter q/(2*rho) (see Eqs. 1, 2 and 3) that is spatially compact in the cross-line direction, before adding the filtered output to Vz at the locations where Vz has been obtained to produce the 3D deghosted output. Alternatively, the crossline wavenumber spectrum may be estimated more explicitly using the described methods, inverse fourier transformed to a denser/more regular set of measurements and filtered (e.g., in the f, x, y-domain) using an approximation of the filter q/(2*rho) (see Eqs. 1, 2 and 3) that is spatially compact in the cross-line direction, before adding the filtered output to Vz at the locations where Vz has been obtained to produce the 3D deghosted output. Thus, many different embodiments of the invention are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
  obtaining pressure data acquired by seismic sensors towed as part of a spread of streamers;
  obtaining particle motion data indicative of particle motion at locations of the sensors; and deghosting one of the pressure data and the particle motion data, the deghosting comprising processing the other one of the pressure data and the particle motion data in a processor-based machine to perform filtering of the other one of the pressure data and the particle motion data, the filtering comprising applying a filtering factor to the other one of the pressure data and the particle motion data based at least in part on inline wavenumber spectra and crossline wavenumber spectra of the other one of the pressure data and the particle motion data.

2. The method of claim 1, wherein the act of obtaining the particle motion data comprises:
estimating the particle motion data from the pressure data.

3. The method of claim 1, wherein the act of obtaining the particle motion data comprises:
acquiring the particle motion data from particle motion sensors that are part of the spread of streamers.

4. The method of claim 1, wherein the particle motion data comprises vertical velocity and lateral velocity data.

5. The method of claim 1, wherein the particle motion data comprises vertical velocity data and no lateral velocity data.

6. The method of claim 1, wherein the spread of streamers comprises a three-dimensional spread of over/under pairs of streamers.

7. The method of claim 6, wherein the particle motion data comprises vertical velocity data, the method further comprising:
estimating the vertical velocity data at each over/under pair using the pressure data acquired in the over/under pair.

8. The method of claim 1, wherein the act of processing to perform the filtering comprises estimating the cross-line wavenumber spectra based at least in part on the particle motion data.

9. The method of claim 1, wherein the act of processing to perform the filtering comprises interpolating particle motion at cross-line positions based at least in part on the particle motion data.

10. The method of claim 1, wherein the particle motion data comprises vertical component velocity data, and the act of deghosting further comprises:
filtering the particle motion data based at least in part on estimated cross-line spectra of the particle motion data; and
combining results of the filtering with the pressure data.

11. The method of claim 1, further comprising using the results of the deghosting to remove surface multiples.

12. The method of claim 11, wherein the pressure data is associated with multiple surveys conducted using the spread of streamers, and the deghosted pressure data is associated with the multiple surveys.

13. The method of claim 12, wherein the deghosting produces pressure data that comprises upgoing and downgoing components for each of the surveys, and the act of using the results of the deghosting to remove surface multiples comprises combining the upgoing and downgoing components to generate surface multiple data indicative of the surface multiples.

14. The method of claim 13, further comprising:
processing the pressure data and the surface multiple data to remove the surface multiples.

15. The method of claim 1, wherein the spread of the streamers comprises a three-dimensional spread of streamers or a two-dimensional spread of streamers.

16. A system comprising:
an interface to receive pressure data acquired by seismic sensors towed as part of a spread of streamers and receive particle motion data indicative of particle motion at locations of the sensors; and
a processor to:
filter one of the pressure data and the particle motion data based at least in part on inline wavenumber spectra and crossline wavenumber spectra of the one of the pressure data and the particle motion data; and
deghost the other one of the pressure data and the particle motion data based at least in part on the results of the filtering.

17. The system of claim 16, wherein the spread of streamers comprises a three-dimensional spread of streamers or a two-dimensional spread of streamers.

18. An article comprising a computer accessible storage medium to store instructions that when executed by a processor-based system cause the processor-based system to:
obtain pressure data and particle motion data acquired by seismic sensors towed as part of a spread of streamers;
obtain particle motion data indicative of particle motion at location of the sensors;
filter one of the pressure data and the particle motion data based at least in part on inline wavenumber spectra and crossline wavenumber spectra of the one of the pressure data and the particle motion data; and
deghost the other one of the pressure data and the particle motion data based at least in part on the results of the filtering.

19. The article of claim 18, wherein the spread of streamers comprises a three-dimensional spread of streamers or a two-dimensional spread of streamers.

* * * * *